(12) United States Patent
Abruzzo et al.

(10) Patent No.: US 9,115,968 B1
(45) Date of Patent: Aug. 25, 2015

(54) COURSE SELF-CORRECTING PROJECTILE

(71) Applicants: Benjamin Abruzzo, Newark, NJ (US); Thomas Recchia, Succasunna, NJ (US); Michael Pica, Levittown, PA (US); Mark Mellini, Denville, NJ (US); Eric Marshall, Wyckoff, NJ (US); Jason DeVenezia, Newton, NJ (US); Sean Schumer, Lincoln Park, NJ (US); John Thomas, Morris Plains, NJ (US)

(72) Inventors: Benjamin Abruzzo, Newark, NJ (US); Thomas Recchia, Succasunna, NJ (US); Michael Pica, Levittown, PA (US); Mark Mellini, Denville, NJ (US); Eric Marshall, Wyckoff, NJ (US); Jason DeVenezia, Newton, NJ (US); Sean Schumer, Lincoln Park, NJ (US); John Thomas, Morris Plains, NJ (US)

(73) Assignee: The United States of America as Represented by the Secretary of the Army, Washington, DC (US)

(*) Notice: Subject to any disclaimer, the term of this patent is extended or adjusted under 35 U.S.C. 154(b) by 12 days.

(21) Appl. No.: 14/178,968

(22) Filed: Feb. 12, 2014

(51) Int. Cl.
*F42B 15/01* (2006.01)
*F42B 30/00* (2006.01)
*F42C 19/00* (2006.01)

(52) U.S. Cl.
CPC .............. *F42B 30/006* (2013.01); *F42C 19/00* (2013.01)

(58) Field of Classification Search
USPC .............. 244/3.1, 3.15, 3.19, 3.2, 3.21, 3.27; 102/473, 501, 265, 275.9
See application file for complete search history.

(56) References Cited

U.S. PATENT DOCUMENTS

| 5,755,400 A * | 5/1998 | Kalms, III ................... 244/3.17 |
| 6,779,752 B1 * | 8/2004 | Ratkovic ..................... 244/3.15 |
| 7,500,636 B2 * | 3/2009 | Bredy .......................... 244/3.15 |
| 7,834,300 B2 * | 11/2010 | Zemany et al. .............. 244/3.15 |
| 2003/0057320 A1 * | 3/2003 | Schneider et al. ............. 244/63 |
| 2005/0040280 A1 * | 2/2005 | Hua .............................. 244/3.1 |

* cited by examiner

Primary Examiner — J. Woodrow Eldred
(74) Attorney, Agent, or Firm — Michael C. Sachs

(57) ABSTRACT

A new fuze that reduces projectile miss-distance to a target, by correcting for discrepancies in anticipated round velocities through its flight. As a result, the fuze-equipped projectile is nominally aimed at a target and maintains improved accuracy relative to a conventional round. The fuze adjusts for the discrepancies in velocity by using an internal electric motor to mechanically actuate a drag-altering surface on the fuze body. In order to adjust for errors in the anticipated velocity, the fuze compares its preprogrammed velocity to its actual velocity at a given point in time during flight. An anticipated velocity table versus time in flight is constantly referenced so that appropriate adjustments in velocity can be made.

18 Claims, 4 Drawing Sheets

COURSE SELF-CORRECTING PROJECTILE

GOVERNMENTAL INTEREST

The invention described herein may be manufactured and used by, or for the Government of the United States for governmental purposes without the payment of any royalties thereon.

FIELD OF THE INVENTION

The present invention generally relates to the field of munitions such as explosive projectiles. Particularly, the present invention relates to a projectile that is capable of self-correcting its course toward an intended target, during flight.

BACKGROUND OF THE INVENTION

Traditional long range artillery munitions have been a mainstay of warfare over the centuries. Much effort has been spent attempting to improve upon the accuracy of the projectiles. With the development of semiconductors and the integrated circuits, it has become possible to install embedded controllers to measure in-flight dynamics and to correct for inaccuracies and disturbances as integral components of the artillery rounds.

In terms of accuracy, the dispersion pattern of impact locations increases with the increasing range of projectiles. Factors that contribute to the increased dispersion are winds aloft (meteorological data), propellant temperature variations, and marginal errors in gun elevations. The final dispersion pattern is an elongated ellipse with the major axis in the direction of flight.

Winds aloft present one form of disturbance in that crosswinds can send a projectile left or right relative to the intended target, and head and tail winds can propel the projectile too far or too short of the intended target.

Recently, different propellants have been used, some combust more quickly and propel the projectiles out of the cannon at higher velocities than others. As a result, resources have been dedicated to characterize the different production lots of propellants, as they leave the factory. Ambient temperature also affects the propellant in a gun in that a hot propellant typically produces increased muzzle velocities, while a cold propellant produces lower muzzle velocities.

In addition to external dynamics, there are issues that affect the performance of the electronics installed within the projectiles. For inertial sensors, the severe gun-launch environment often produces permanent bias shifts in the measured acceleration of the projectiles. Additionally, the high spin rate of the stabilized projectiles may also affect the readings on a sensor, by adding spurious centrifugal forces to the sensor that are not, in reality, affecting the projectile.

One method to improve the accuracy of the projectile is to install GPS receivers that input an accurate estimate of the physical location of the projectile into the controller. Additionally, the data from the GPS receivers can be coupled with advanced inertial suites capable of being calibrated and continuously updated throughout the flight of the projectile, to improve performance. U.S. Pat. Nos. 7,500,636 and 7,834,300 are examples of the increasing complexity of integrated systems to guide a ballistic munition.

Separately, the additional confounding of data by the spin-stabilization is to add canards to the fuze, as well as high cost bearings. This combination allows the electronics stored in the fuze to be "de-spun" and acts independently of the spinning of the round.

Previous fuze efforts attempted to correct for the range dispersion and to improve the accuracy of spin stabilized projectiles in impact locations, by employing a single action drag brake. Reference is made, for example, to U.S. Pat. Nos. 6,345,785 and 5,816,531. In this application, the munition is intentionally fired "too-long," such that if uncorrected, the projectile would fly past the intended target. Then, while in flight, the controller would determine the best time for the drag brake to be deployed.

Incorporating guidance into artillery rounds increases the cost of the entire system. Gun-hardened, inertial measurement systems are relative costly. Similarly, a significant cost driver is the gun-hardening of components and electronics (e.g., GPS) to survive the loads of gun-launching and to improve the flight path accuracy.

GPS denial is a modern concern, between land/space based intentional jamming of signals by adversarial actors, solar activity also can prevent GPS signals from being received or correctly interpreted. However, should the electronics on-board the projectile be duds, then the projectile will fly past the intended target and potentially cause collateral damage. For obscurant or illumination, it would be beneficial to have a very low cost round that allows soldier assistance without prohibitive expenses.

There is therefore a need for a projectile that is capable of autonomously self-correcting its course toward an intended target, during flight. The projectile should be capable of being nominally aimed at the target, and of maintaining improved accuracy relative to a conventional round. The projectile should not require overshoot adjustment. The projectile should be capable of being deployed at a less full or optimal deployment, so that in the event of electronics or mechanism failure to maneuver the nominal flight, the projectile would follow the flight trajectory of a conventional projectile, including the standard statistical impact dispersion around the target location.

The need for such a course, self-correcting projectile has heretofore remained unsatisfied.

SUMMARY OF THE INVENTION

The present invention addresses the concerns of conventional projectiles and presents a new fuze that reduces projectile miss-distance to a target, by correcting for discrepancies in anticipated round velocities through its flight. As a result, the fuze-equipped projectile is nominally aimed at a target and maintains improved accuracy relative to a conventional round.

The invention adjusts for the discrepancies in velocity by using an internal electric motor to mechanically actuate a drag-altering surface on the fuze body. The resulting increase and decrease in drag, affects the velocity profile of the projectile in flight, thus affecting its point of impact as it pertains to the distance from launch.

In order to adjust for errors in the anticipated velocity, the fuze compares its preprogrammed velocity to its actual velocity at a given point in time during flight. The preprogrammed velocity electronically is inputted before launch, into a memory on board the fuze. After the gun launch parameters are determined, the RF signal projected by the velocimeter will be provided with an anticipated velocity table versus time in flight. This table will be constantly referenced so that appropriate adjustments in velocity can be made.

A two-stage approach is implemented for the fuze to determine its actual velocity during flight. In the first stage, the fuze determines velocity via detection of a Doppler-shifted signal, which originates from a velocimeter that is positioned at the launch location. The velocimeter projects a 10.25 GHz continuous-wave RF signal in the direction of the fuze. An internal conformal antenna within the fuze is tuned to this frequency, and receives the stationary signal from the velocimeter.

This signal is then mixed with a monolithic microwave integrated circuit (MMIC) of a similar frequency and low-pass filtered to obtain a baseband signal. The frequency of this baseband signal corresponds to a Doppler-shift due to the projectile velocity, allowing the projectile velocity to be explicitly determined.

Because the velocimeter has a limited gain and thus a limited transmission range, the fuze will not be able to receive the velocimeter projected signal as soon as the distance between the velocimeter and the fuze surpasses a threshold distance. As a result, the second stage of the velocity determination enters into effect. Once the predetermined threshold distance is surpassed, the fuze uses an accelerometer to determine its actual velocity. Acceleration readings are integrated and added to the previous time-step velocity value to determine the current velocity.

To implement an accelerometer as a modality for the measurement of velocity in gun launched munitions, it has inherent errors that must be overcome. The noisy accelerometer data includes two errors that are inherent in a gun-launched and fuze-mounted applications: the shift-after-shock bias and the mount-error spin bias.

The shift-after-shock bias occurs at gun launch and persists for the duration of flight. Due to the large G-forces experienced during gun launch, the accelerometer becomes permanently biased by a static value.

The mount-error spin bias occurs as a result of two non-ideal placement errors of the accelerometer. These errors are: (a) the distance from the center of the accelerometer to the radial center of the fuze perpendicular to the direction of travel of the fuze, and (b) the angular placement of the accelerometer relative to perpendicular the direction of travel of the fuze.

These two errors are unknown at launch but lead to the error equation $\epsilon_a + \epsilon_b \omega^2$ where $\epsilon_a$ is the static bias error, $\epsilon_b$ is the angular error component, and $\omega$ is the spin rate of the projectile.

To remove the accelerometer error, the fuze determines the foregoing three unknowns: $\epsilon_a$, $\epsilon_b$, and $\omega$. The spin-rate, $\omega$, is determined by an on-board magnetometer. The spin of the projectile will result in a frequency component being visible when sampling the magnetometer that directly corresponds to the spin-rate of the projectile.

In order to correct for these errors, the actual acceleration must be known. This can be derived from the Doppler calculated velocity. An accurate acceleration is calculated by time-filtering and differentiating the velocity.

The two error components, the static bias error, $\epsilon_a$, and the angular error component, $\epsilon_b$, are determined while the projectile is in range of the muzzle velocimeter. Because the velocimeter provides an accurate and reliable measurement of acceleration, every time-step that the acceleration is determined by the velocimeter and accelerometer and sampled, it yields the bivariate equation $\alpha_a - (\epsilon_a + \epsilon_b \omega^2) = \alpha_v$, where $\alpha_a$ is the acceleration measurement of the accelerometer, and $\alpha_v$ is the acceleration measurement of the velocimeter.

These two errors are removed by a least squares solution to the over-determined mathematic system that is created by sampling from both acceleration methods many times. Once the error is removed from the accelerometer, the fuze can adjust for velocity for the duration of the flight, and guide to its intended target with increased accuracy.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

Similar numerals refer to similar elements in the drawings. It should be understood that the sizes of the different components in the figures are not necessarily in Exact proportion or to scale, and are shown for visual clarity and for the purpose of explanation.

DETAILED DESCRIPTION OF PREFERRED EMBODIMENTS

Figure 1:
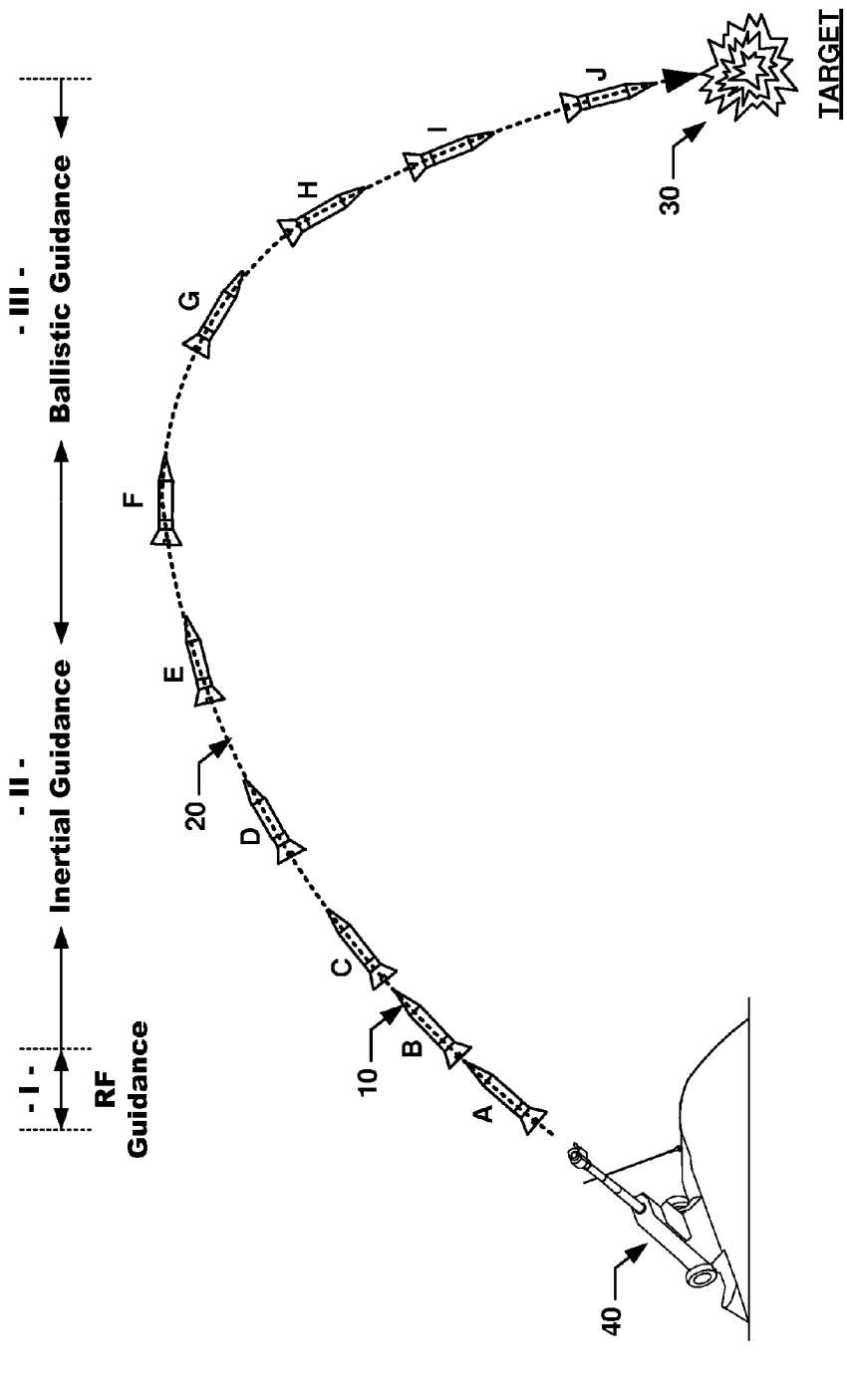
FIG. 1 illustrates a flight path of a projectile according to the present invention.

With reference to FIG. 1, the present invention provides a new fuze-equipped projectile 10 that autonomously self-corrects its course 20 toward an intended target 30, during flight. The projectile 10 can be initially, nominally aimed at the target 30, and it can self correct its flight path (or course) 20 to maintain improved accuracy relative to a conventional round. As it will be explained later, the projectile 10 uses a continuously variable surface to fine-tune the drag forces, in order to minimize, if not eliminate overshoot adjustment.

FIG. 1 illustrates various exemplary positions, A through J, of the projectile 10, along the flight path 20, starting at a launch position 40, and ending at the target 30.

Figure 2:
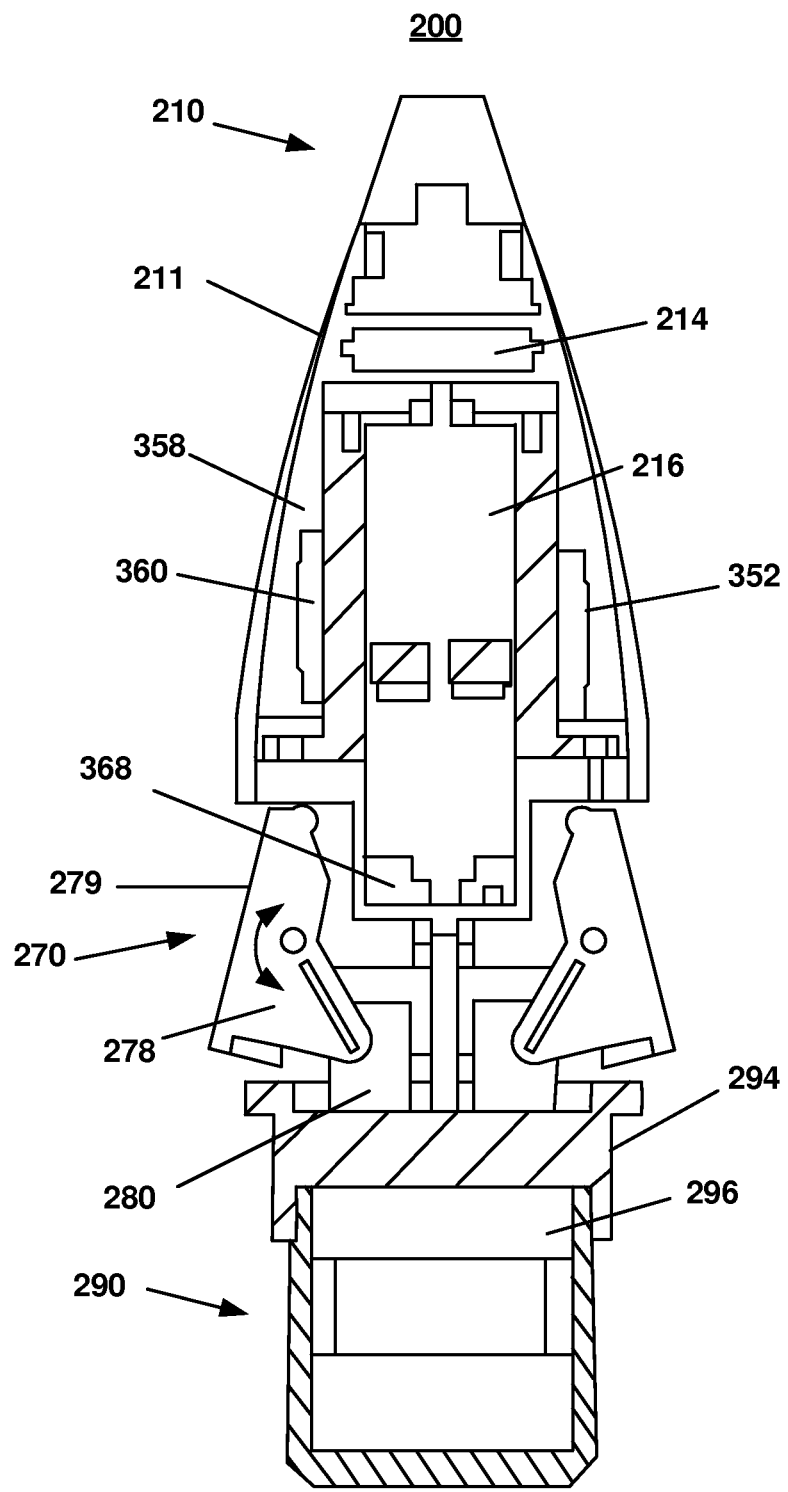
FIG. 2 is a greatly enlarged cross-sectional view of the projectile of FIG. 1, illustrating the main components of the projectile.

With further reference to FIG. 2, in order to prevent external jamming of the guidance signals, the projectile 10 is provided with a fuze 200 that is jam resistant and GPS independent. To this end, the fuze 20 uses three distinct guidance methods (or Phases) along the flight path 20.

During the initial Phase I (or RF Guidance phase), as illustrated by position A of the projectile 10, the fuze 200 uses a reference RF (radio frequency) signal from the launch position (or gun location) 40 to calibrate an on-board accelerometer for a short period of time following launch. After the projectile 10 has left the vicinity of the launch position 40, it is guided inertially (inertial guidance or Phase II—as illustrated by positions B through F of the projectile 10.) to an apogee position F, and then ballistically (ballistic guidance of Phase III) to the target 30, as illustrated by positions G through J of the projectile 10.

To this end, the fuze 200 is generally comprised to a fuze body 210 that is secured to a fuze base assembly 290. An adjustable drag assembly 270 is secured to the fuze body 210, and is located intermediate the fuze body 210 and the fuze base 290.

Figure 3:
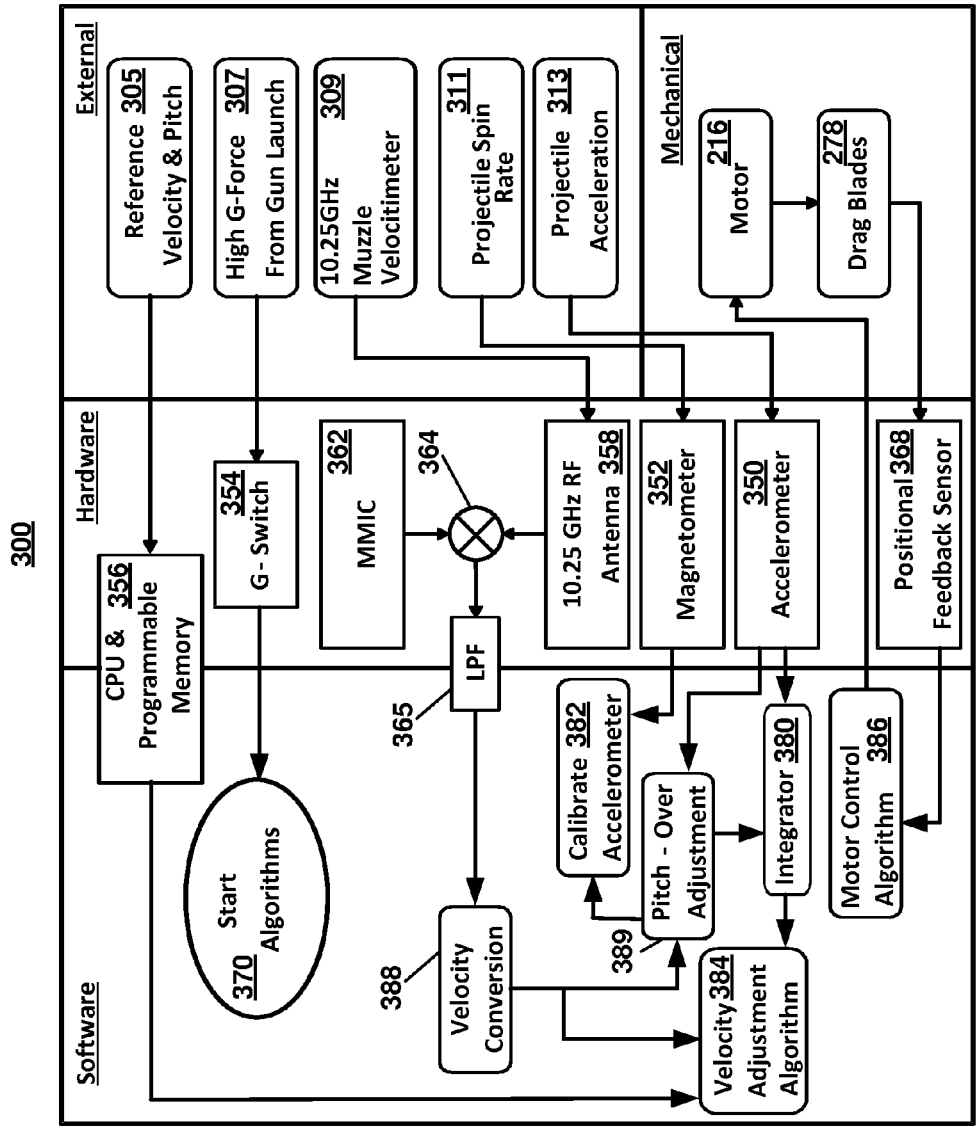
FIG. 3 is a block diagram of a high-level architecture of a course self-correcting module that forms part of the projectile of FIGS. 1 and 2.

Considering now the fuze body 210 in more detail, and with further reference to FIG. 3, it generally includes an outer ceramic shell 211 that houses and protects the electronic, mechanical, and other components of the fuze 200. More specifically, these components include, without limitation, a fuze setter inductive coil 212 whose function is known or available and thus will not be described in greater detail.

An electronics assembly 214 is mounted above an electric motor 216. It comprises an accelerometer 350, a G-switch 354, and a CPU (computer or processor) and programmable memory 356 (FIG. 3).

An electric motor 216 is disposed axially within the outer shell 211. It includes a motor shaft 217 that contacts a ball bearing which in turn contacts a base plate 294 of the base assembly 290, which allows it to freely rotate. The motor shaft 217 extends through, and is further secured to a piston head 274 of the drag assembly 270, in order to regulate the drag blades 278.

In an exemplary embodiment, the electric motor 216 is a brushless DC motor. Alternatively, the electric motor 216 can be, for example, a linear actuator, a voice coil/solenoid, or a shape metal alloy system to generate the inward/outward force needed to move the drag assembly 270.

A magnetometer 352, a conformal 10.25 GHz antenna 358, an MMIC assembly 360, an MMIC assembly 360, and a positional feedback sensor 368 (FIG. 3) are also positioned within the outer shell 211. The MMIC assembly 360 includes an MMIC 362, a mixer 364, and a low-pass filter circuitry (LPF) 365.

Referring now to the drag assembly 270, it generally includes four drag blades 278 that are rotatably mounted onto a drag mount 280. In turn, the drag mount 280 is secured to the piston head 274. Each drag blade 278 includes an outer drag blade surface 279, whose movement and positioning provide the desired drag to the projectile 10.

The base assembly 290 houses the battery 296 used to power the various electrical and electronic components and circuitries, as well as the electric motor 216 of the fuze 200.

Figure 4:
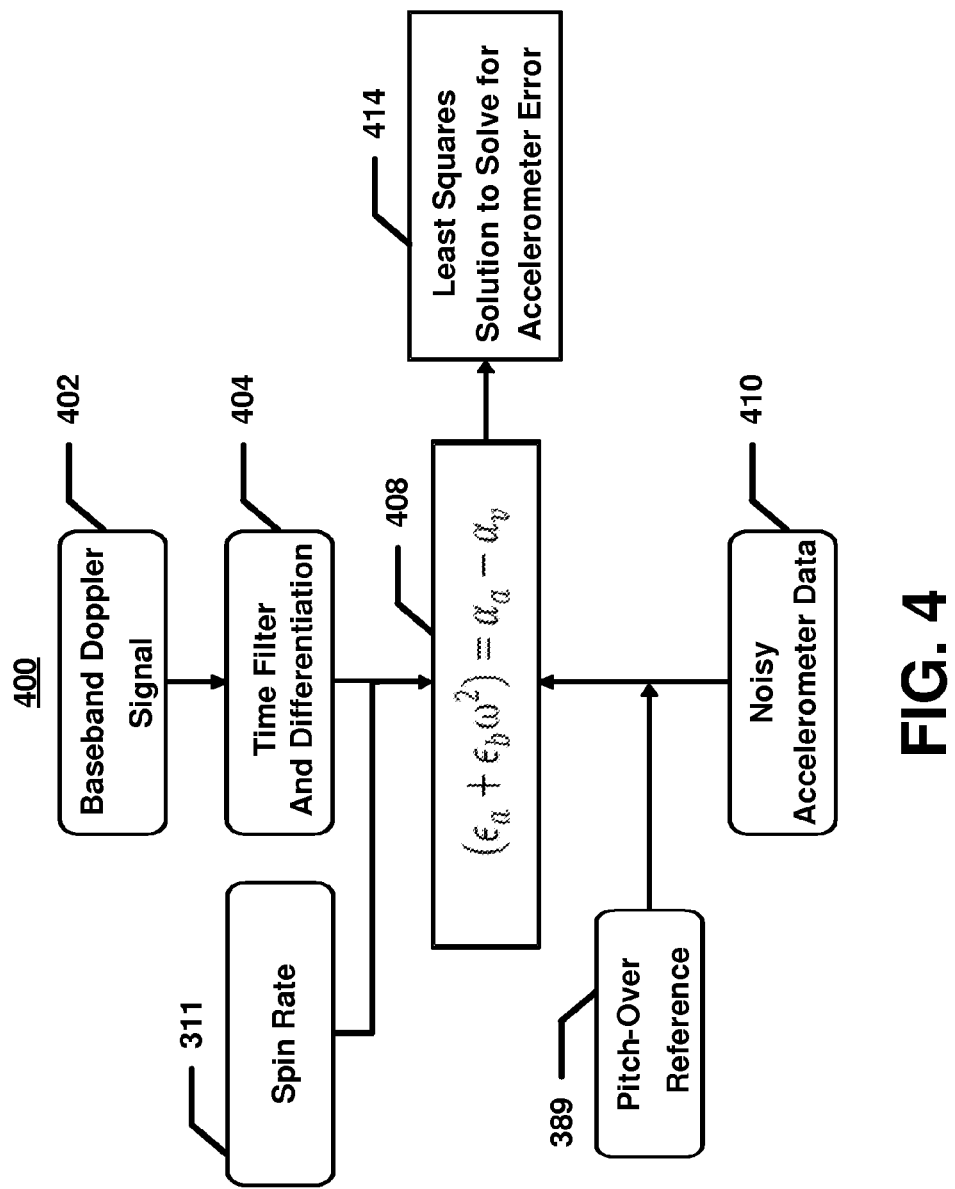
FIG. 4 represents a flow chart illustrating a course correction method of operation of the course self-correcting module of FIG. 2.

Among the numerous aspects of the present invention, two major aspects will be emphasized herein: the drag assembly (or drag generation mechanism) 270 of FIG. 2, and the method for removing errors from the accelerometer 350 to allow for accurate guidance (FIG. 4).

While previous drag braking methods include a single-use application of drag blades, which would use the spin of the projectile to pull the drag brakes into the free stream, the present invention uses the opposing inward force of aerodynamic pressure to balance the outward centrifugal force of mass. This minimizes the force and power consumption required to deploy or retract the drag blades 278, as it will be described later in more detail.

The operation and error correction function of the fuze 200 will now be described in more detail, with further reference to FIGS. 3 and 4. During Phase I, an ideal velocity profile 305 (FIG. 3) is pre-loaded into the programmable memory 356 of the fuze 200, so that this velocity profile can be used, during flight, as a reference against which the velocity that is measured by the fuze 200 will be compared.

As illustrated in the exemplary preferred embodiment of the present invention, the drag assembly 270 is initially preset, by the onboard processor 356 to, for example, fifty percent deployed. The projectile 10 is then loaded into the gun (launch or firing platform) at the launch position 40, and fired. The high-G force 307 resulting from the gun launch is sensed by the G-switch, which, in turn, initiates the algorithms (residing on the CPU 356) to start.

The drag blades 278 (also referred to as drag brakes) can increase or lower wind resistance based on how open they are. If the drag blades 278 were completely closed, the fuze 200 would have the same aerodynamics as a normal fuze (i.e., a smooth body). While setting the initial position of the drag blades 278 to completely closed would allow for maximum potential range, the problem arises that the initial trajectory of the projectile 10 would require an overshoot of the intended target 30 to maximize adjustment capability to the target. If there is some sort of failure in the drag blades 278 after launch, the projectile 10 would miss the target 30 by an unsafe margin as its mean point of impact would then be off target. Therefore, by having the drag blades 278 set to approximately 50% deployment on launch, the sacrifice is approximately 8% of the projectile maximum range for the safety of a catastrophic failure of the drag blades 278 resulting in a dispersion distributed about the intended target 30.

During Phase I, the gun transmits a consistent reference RF signal at, for example, 10.25 GHz frequency. After the projectile 10 leaves the barrel of the gun, it begins to receive the reference RF signal, with the frequency shifted by the Doppler-effect 402 (FIG. 4).

In Phase II, the fuze 200 uses the fixed frequency of a velocimeter 309 to read and determine the frequency of the Doppler-shifted reference signal for a short period of time after muzzle exit. This Doppler-shifted signal can be directly calculated as a velocity 388. Comparing the calculated velocity to the programmed reference velocity 305, the fuze 200 can then adjust for this discrepancy. Because the angle from the velocimeter to fuze will not be equivalent to the pitch-angle of the round, a pitch-over adjustment 389 must be made by utilizing the reference pitch 305 programmed into memory 356 to determine the true velocity of the fuze 200.

It is quite unlikely that the accelerometer 350 can be mounted perfectly on the axis of the fuze 200 without any misalignment angles or displacement off center. Any of these off-axis placements will contribute some error to the reading of the accelerometer 350. The present invention uses the magnetometer 352 in the fuze 200 to determine the spin rate 311 of the projectile 10 in flight. It can be assumed that the error contributed to the acceleration measurement will be a function of the displacements multiplied by the square of the spin rate 311.

The CPU 356 determines blade deployment is by measuring the difference between the preprogrammed reference velocity table with the calculated velocity.

With reference to FIG. 4, the accelerometer 350 presents two inherent errors that must be overcome. The noisy accelerometer data 410 includes two errors that are inherent in a gun-launched and fuze-mounted applications: the shift-after-shock bias and the mount-error spin bias. The shift-after-shock bias occurs at gun launch and persists for the duration of flight. Due to the large G-forces experienced during gun launch, the accelerometer 350 becomes permanently biased by a static value.

The mount-error spin bias occurs as a result of two non-ideal placement errors of the accelerometer. These errors are: (a) the distance from the center of the accelerometer to the radial center of the fuze perpendicular to the direction of travel of the fuze, and (b) the angular placement of the accelerometer relative to perpendicular the direction of travel of the fuze. These two errors are unknown at launch but lead to the error equation 408: $\epsilon_a + \epsilon_b \omega^2$ where $\epsilon_a$ is the static bias error, $\epsilon_b$ is the angular error component, and $\omega$ is the spin rate 311 of the projectile 10.

To remove the accelerometer error, the fuze 200 determines the foregoing three unknowns: $\epsilon_a$, $\epsilon_b$, and $\omega$. The spin-rate 311, $\omega$, is determined by the on-board magnetometer 352. The spin of the projectile 10 will result in a frequency component being visible when sampling the magnetometer 352 that directly corresponds to the spin-rate 311 of the projectile 10.

The two error components, the static bias error, $\epsilon_a$, and the angular error component, $\epsilon_b$, are determined while the fuze 200 is in range of the muzzle velocimeter 309. Because the velocimeter 309 provides an accurate and reliable measurement of velocity, and thus acceleration, every time-step that the acceleration determined by the velocimeter 309 and the acceleration determined by the accelerometer 350 is sampled, it yields the bivariate equation $\alpha_a - (\epsilon_a + \epsilon_b \omega^2) = \alpha_v$, where $\alpha_a$ is the acceleration measurement of the accelerometer 350, and $\alpha_v$ is the acceleration measurement of the velocimeter 309.

In order to correct for these errors, the actual acceleration must be known. This can be derived from the Doppler calculated velocity. An accurate acceleration is calculated by time-filtering and differentiating the velocity at 404.

These two errors are removed by a least squares solution 414 to the over-determined mathematic system that is created by sampling from both modalities many times. Once the error is removed from the accelerometer 350, the fuze 200 can adjust for velocity for the duration of Phase II of the flight, and guide to its intended target 30 with increased accuracy.

In order to determine the ground velocity of the fuze 200 using the accelerometer 360, the accelerometer 360 utilizes an integrator 380 and the pitch-over reference adjustment data 389 to determine the contribution of acceleration due to gravity, which is solely a function of pitch-over angle. The contribution of the acceleration due to gravity is fed to a velocity adjustment algorithm 384.

In Phase II, the fuze 200 continues to adjust for velocity shifts due to environmental conditions, until the projectile 10 reaches the apogee position F, which indicate; the end of Phase 11.

Upon reaching the apogee position F, the projectile 10 enters the ballistic guidance phase, wherein no new adjustments or calculations are entered, and the projectile 10 starts descending under the force of gravity toward the target 30.

Consequently, the present projectile improves the flight accuracy toward the target 30, reduces collateral damage, and maintains relatively simple instructions for field operations.

Another advantage of the present projectile is its reduced cost of manufacture. The projectile utilizes a simplified guidance system, which relies on a single accelerometer 350 to measure the axial velocity of the projectile 10, and the magnetometer 352 which is used to measure the spin rate 311 of the projectile 10. The reduced number and cost of the components necessarily entails a lower cast as compared to a conventional GPS-equipped projectile.

It should be understood that other modifications might be made to the present self-correcting projectile without departing from the spirit and scope of the invention.

What is claimed is:

1. A method of using a fuze for self-correcting a projectile course during flight from a launch position to a target, the method comprising:
    a memory stores an ideal velocity profile;
    during flight, the fuze consecutively follows a RF guidance phase, an inertial guidance phase, and a ballistic guidance phase;
    wherein during the RF guidance phase, the fuze uses a Doppler shift from the launch position, to detect a projectile velocity;
    wherein during the inertial guidance phase, the fuze autonomously and continuously self-corrects the projectile course; and
    wherein during the ballistic guidance phase, the projectile is allowed to follow a descent path toward the target.

2. The method of claim 1, wherein the fuze uses the Doppler shift by using a reference radio frequency signal from the launch position to calibrate an on-board accelerometer.

3. The method of claim 2, wherein the fuze uses the projectile velocity to determine a velocity error; and
    wherein the fuze corrects the projectile course for the velocity error.

4. The method of claim 3, wherein the fuze corrects the projectile course for the velocity error, by a selective deployment of a drag brake.

5. The method of claim 3, wherein the fuze further calibrates an onboard accelerometer using the reference radio frequency signal.

6. The method of claim 5, wherein the fuze enters the inertial guidance phase upon loss of the reference radio frequency signal; and
    wherein the fuze determines the projectile velocity based on data from the calibrated on-board accelerometer.

7. The method of claim 6, wherein the fuze autonomously and continuously self-corrects the projectile course during the inertial guidance phase, by adjusting for velocity shifts due to environmental conditions.

8. The method of claim 7, wherein upon the projectile reaching an apogee of the course, the fuze enters the ballistic guidance phase.

9. The method of claim 8, wherein the drag break is returned to a predetermined deployment position, in preparation for the descent path toward the target.

10. The method of claim 6, wherein the fuze accounts for inherent errors in the on-board accelerometer; and
    wherein the inherent errors include a shift-after-shock bias and a mount-error spin bias.

11. The method of claim 10, wherein the mount-error spin error is unknown at launch and includes results from two non-ideal placement errors of the on-board accelerometer.

12. The method of claim 11, wherein the fuze uses the two non-ideal placement errors to determine an error equation: $\epsilon_a + \epsilon_b \omega^2$, where $\epsilon_a$ is a static bias error, $\epsilon_b$ is an angular error component, and $\omega$ is a spin rate of the projectile.

13. The method of claim 12, wherein the fuze determines the two non-ideal placement errors during the RF guidance phase.

14. The method of claim 13, wherein the fuze removes the two non-ideal placement errors by a least squares solution.

15. The method of claim 14, wherein upon removal of the two non-ideal placement errors from the on-board accelerometer, the fuze adjusts for the projectile velocity for the duration of the flight.

16. A fuze for use in a projectile, for self-correcting a projectile course during flight from a launch position to a target, the fuze comprising:
    a memory stores an ideal velocity profile;
    during flight, the fuze consecutively follows a RF guidance phase, an inertial guidance phase, and a ballistic guidance phase;
    wherein during the RF guidance phase, the fuze uses a Doppler shift from the launch position, to detect a projectile velocity;
    wherein during the inertial guidance phase, the fuze autonomously and continuously self-corrects the projectile course; and
    wherein during the ballistic guidance phase, the projectile is allowed to follow a descent path toward the target.

17. The fuze of claim 16, wherein the projectile is initially nominally aimed at the target; and wherein the fuze adjusts for discrepancies in velocity by using an electric motor to mechanically actuate a drag-altering surface on a fuze body.

18. The fuze of claim 17, wherein the fuze adjust for the discrepancies in velocity by comparing a preprogrammed velocity of the ideal velocity profile to an actual velocity at a given point in time during flight.

\* \* \* \* \*